Figure 2:
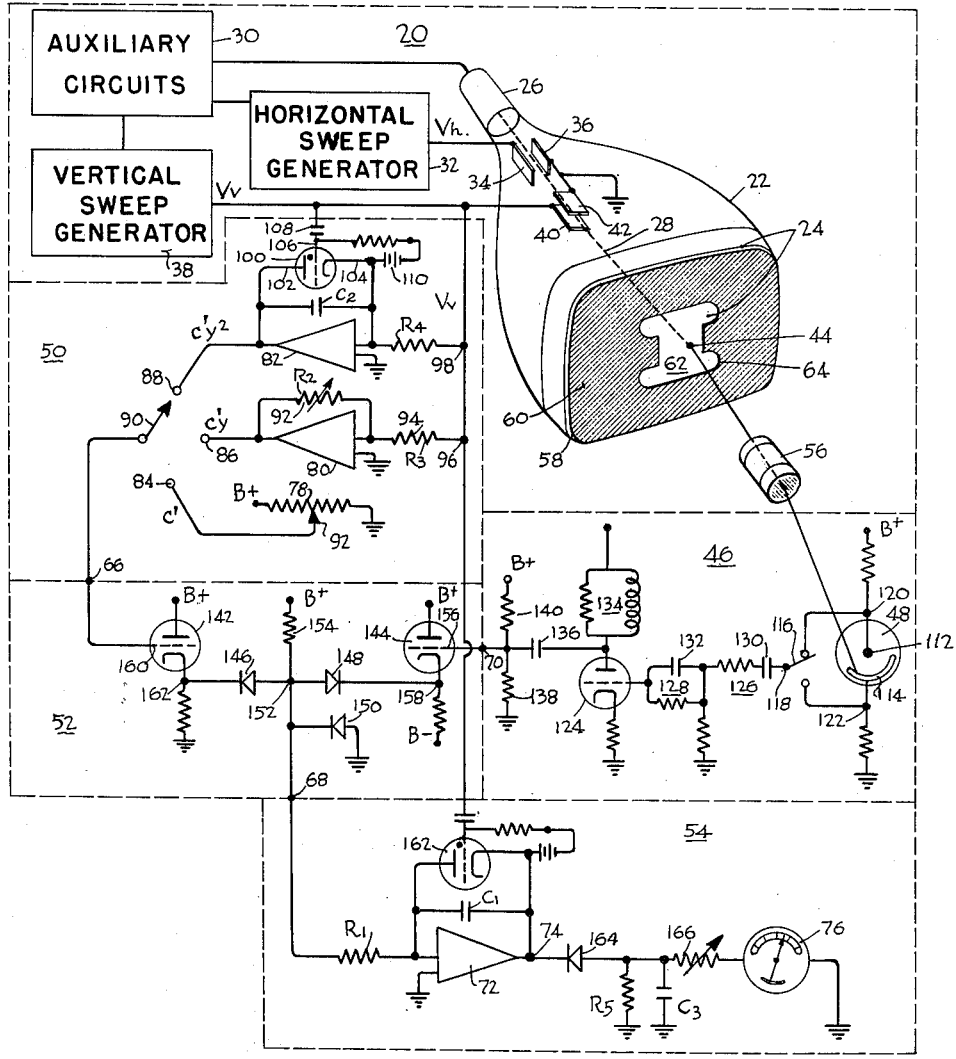

May 15, 1962

G. R. ARCHER 3,034,710

PLANAR COMPUTER

Filed Feb. 20, 1959

INVENTOR

George R. Archer

BY Thomas A. Davenport

ATTORNEY

United States Patent Office 3,034,710
Patented May 15, 1962

---

3,034,710
PLANAR COMPUTER
George R. Archer, Salfordville, Pa., assignor to The Budd Company, Philadelphia, Pa., a corporation of Pennsylvania
Filed Feb. 20, 1959, Ser. No. 794,704
15 Claims. (Cl. 235—61.6)

This invention pertains to a system for computing functions of plane figures and, more particularly, to such a system as adapted for the evaluation of iterated integrals with respect to a plane region.

In the past, considerable time has been required to evaluate areas, moments and other double integrals based upon the area of a plane figure or upon the cross-sectional area of a three-dimensional object. Such evaluations are necessary for the solution of dynamic and static design problems, for the investigation of statistical plots and generally as an aid in applied research. Also, there is a need for rapid quantitative data concerning dependence of such integrations upon variation of one or more of the dimensional or axial orientation parameters of the planar representation.

Certain digital and analogue computers are available for exact solutions of these functions. They are, however, expensive, difficult to encode and decode, and do not lend themselves to investigation of parameter variations without retracing of the laborious computations of a complete solution. Lacking a relatively inexpensive and flexible system to produce, automatically, quantitative solutions of these problems, much research time is expended in performing routine mathematical analysis.

Therefore, it is an object of this invention to provide an improved system for planar computations.

Another object is to provide a planar computation system readily adapted for generating successive solutions as changes are made in the figure investigated.

A further object is to provide an economical system for evaluating double-integral functions of plane regions with minimum encoding of the problem and minimum decoding of its solution.

According to an illustrated embodiment of this invention, the planar computer system for evaluating double-integral functions of a plane figure includes scanner means repetitively scanning a spot of light over a region at predetermined vertical and horizontal velocities, a mask overlaying the scanning region having differential transmission areas representing the figure to be investigated, light responsive means oriented to receive light transmitted from the scanner means through the mask and generating a gating signal in response thereto, integrand generator means generating an integrand signal proportional to a function of displacement of the light spot, integral generator means responsive to the integrand signal generating an integral signal proportional to the integral with respect to time of the integrand signal, and gating means responsive to the gating signal selectively connecting together and disconnecting the integrand and integral generator means. The integral signal may be displayed by voltmeter means, the voltmeter dial being calibrated in convenient units for direct read-out of the desired double-integral function of the plane figure.

Figure 1:
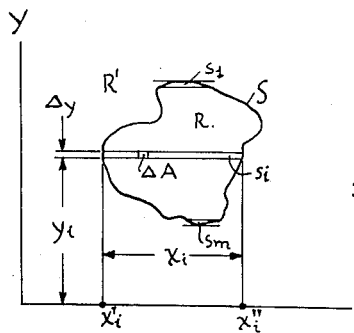

While the inventon is particularly pointed out and distinctly claimed in the claims appended to this specification, the invention and further objects and advantages thereof will be better understood from the following description taken in connection with the drawing wherein:

FIGURE 1 illustrates basic concepts requisite to an understanding of this invention; and FIGURE 2 is a partly schematic and partly pictorial illustration of a preferred planar computation system according to this invention.

With reference to FIGURE 1, an understanding of concepts requisite to the system and method of this invention will be had upon consideration of a general region R, bounded by the closed curve S within region R′, coplanar with orthogonal axes $x$ and $y$. According to the theorems of multiple integrals (e.g. see Higher Mathematics for Engineers and Physicists, Sokolnikoff, McGraw-Hill Book Co., 1941), integral areal functions for region R may be expressed generally by:

$$\int_R f(x,y)dA = \iint f(x,y)dydx \qquad (I)$$

For functions which are single valued with respect to translations of R parallel to the $x$ axis (area, $A_R$; vertical coordinate of the centroid, $\bar{y}_R$; moment of inertia of R about the $x$ axis, $I_x$; etc.), the general equation may be simplified as:

$$\int_R f(y)dA = \iint cy^p dydx \qquad (II)$$

where $c$ is a scaler constant and $p$ is zero or a positive integer. For $p=0$ and $c=1$ the area of region R is given by:

$$A_R = \int_R dA = \iint dydx \qquad (III)$$

Similarly, for $p=1$ and $c=1/A$, the centroidal component is $$\bar{y} = \frac{\int_R y dA}{A} = \frac{\iint y dydx}{A} \qquad (IV)$$

For the moment of intertia of R about the $x$ axis, $p=2$ and $c=1$ so that:

$$I_x = \int_R y^2 dA = \iint y^2 dydx \qquad (V)$$

Such iterated integrals, right hand members of the above equations, may be evaluated by first integrating with respect to $x$ and then by integrating the resultant functions with respect to $y$.

It is axiomatic, however, that a summation may be equivalent to an integration within any desired precision when the summation contains a sufficient number of terms, $m$ terms, for example. Therefore, each of the above and similar iterated integrals may be evaluated in the form $$\int_R cy^p dA = \sum_{i=1}^{i=m} y \int_{x_i'}^{x_i''} cy^p dx \qquad (VI)$$

when the entirety of the region R is divided into $m$ parallel strips $s_i$, each displaced a distance $\Delta y$ in the $y$ direction, and each having a length $x_i$ according to:

$$x_i = x_i'' - x_i' \qquad (VII)$$

where $x_i'$ and $x_i''$ are the intercepts of the $i$th strip, $s_i$ with curve S. By expansion:

$$\int_R cy^p dA = c'\left[\int_{x_1'}^{x_1''} y^p dx + \int_{x_2'}^{x_2''} y^p dx + \cdots + \int_{x_m'}^{x_m''} y^p dx\right] \qquad (VIII)$$

where $c'$ is a scaler constant incorporating A.

According to this invention, an equivalent division of R into strips $s_i$ is accomplished through representation of the increment $\Delta y$ by a spot of light and scanning or tracing the light spot in parallel paths across regions R′ and R. The scanning means is exemplified in the pictorial representations of FIG. 2 as a conventional flying spot scanner 20. Scanner 20 comprises a cathode ray tube 22 having a phosphorescent screen 24, an electron gun 26 producing a columnated beam of electrons 28, auxiliary circuits 30 and beam deflection components 32 to 42. The latter may be of the electromagnetic type or, as shown, of the electrostatic type which includes horizontal sweep generator 32 coupled with horizontal deflection plates 34, 36 and vertical sweep generator 38 coupled with vertical deflection plates 40, 42. The flying spot scanner 20 will be recognized by one skilled in the art as the ordinary apparatus used in television receivers and the like. Any such commercially available scanner means may be adapted, as explained hereinfter, for use in the planar computer of this invention.

The function of scanner 20, employed conventionally or as adapted to this invention, is to scan a spot of light 44, in parallel traces over the face of tube 21. The spot of light 44 is the phosphorescence generated at the incidence of electron beam 28 upon phosphorescent screen 24. Therefore, motion of light spot 44 is a concomitant of motion of beam 28.

The electron beam 28 is deflected laterally at a constant velocity by a horizontal sweep voltage $V_h$ generated by horizontal sweep generator 32 and applied to horizontal deflection plate 34. The $V_h$ wave form, depicted with respect to time, is saw-tooth or triangular and serves to deflect beam 28, from left to right, a trace, and then from right to left, a retrace, back and forth across screen 24 in rapid succession at linear horizontal velocities $v_h$. Simultaneously a negative vertical sweep voltage $V_v$ is generated by vertical sweep generator 38 and applied to vertical deflection plate 34 to give the beam 28 a vertical velocity component $v_v$. The $V_v$ wave form is triangular with a relatively long time base. The concomitant successive traces of light spot 44, starting with a first trace across the top of screen 24, are parallel and displaced vertically (downwardly) by a constant distance, $\Delta y$. After a predetermined number of traces, $n$ traces, the beam 28 is deflected to its starting position by the positive slope of $V_v$ at the finish of the lowest, $n$th trace. Such a series of $n$ traces (and $n$ retraces) is termed a field.

One of the conventional functions of auxiliary circuits 30 is to blank the display of light spot 44 during retraces. Also standard is the production of interlaced even and odd numbered fields of $n/2$ traces each. While these latter characteristics of the conventional equipment are not necessary for the adaption of scanner 20 to this invention, no difficulties are presented thereby as will be explained hereinafter. It will be assumed for the present, however, that retrace blanking is employed and the discussion will be limited to single field scanning.

In addition to scanner 20, the illustrated system of this invention comprises an integration interval gating signal generator 46 having a light sensitive means 48 oriented to receive light from spot 44, an integrand signal generator 50, a gating circuit 52, and an integral signal generator 54. Though not required, it is sometimes convenient to arrange a lens system 56 to focus an image of light spot 44 on means 48.

To accomplish the objects of this invention, a mask 58 is superimposed upon the face of cathode ray tube 22 to provide differential light transmission regions corresponding to regions R and R' of FIGURE 1. In the illustrated embodiment, an opaque region 60 is equivalent to region R' and a transparent region, conveniently an aperture, 62 is equivalent to region R. Closed curve 64 bordering regions 60 and 62, is a specific form of curve S, and defines a cross section of an I-beam.

An analogy will now be apparent with the discussion of FIG. 1. The portions of the field of $n$ traces produced by the scanner 20 and visible through aperture 62 are equivalent to the composite of $m$ strips $s_i$ covering the region R within curve S of FIG. 1. Each of the $n$ traces is the ambit of light spot 44 for a single lateral scan at constant horizontal velocity $v_h$ and constant vertical velocity $v_v$. Therefore, the area $A_i$ attributable to the portion of the $i$th trace within region 62 may be described in terms of a constant width $\Delta y$, the vertical displacement of successive scans, and a time period $t_i$ directly related to the length $x_i$ of the trace between its intercepts with curve 64. By definition of velocity:

$$dx = v_h dt \qquad (IX)$$

and $$x_i = (x_i'' - x_i') = v_h(t_i'' - t_i') \qquad (X)$$

where $t_i'$ and $t_i''$ are the times of the initial and final intercepts of light spot 44 with the closed curve 64 during the $i$th trace. It follows then that, by change of variables, Equation VIII may be rewritten as:

$$\int_R cy^p dA = c'' \left[ \int_{t_1'}^{t_1''} y^p dt + \int_{t_2'}^{t_2''} y^p dt + \cdots + \int_{t_m'}^{t_m''} y^p dt \right] \qquad (XI)$$

where $c''$ is a lumped constant chosen empirically to include convenient scaler factors, $t$ indicates a point in time, the subscripts indicate the ordinal numbers of the successive traces from $i=1$ for the first trace through region 62 to $i=m$ for the last trace through region 62, and the prime (') and double prime ('') superscripts indicate, respectively, the points in time of the first and second intercepts of the numbered trace with the closed curve 64.

It is implicit in Equation XI that no anomoly is introduced when terms are included for time periods during which the integrand is zero, as follows:

$$\int_R cy^p dA = c'' \left[ \int_{t_0}^{t_1'} 0\, dt + \int_{t_1'}^{t_1''} y^p dt + \int_{t_1''}^{t_2'} 0\, dt \right.$$
$$\left. + \int_{t_2'}^{t_2''} y^p dt + \cdots + \int_{t_{m-1}''}^{t_m'} 0\, dt + \int_{t_m'}^{t_m''} y^p dt + \int_{t_m''}^{t_n''} 0\, dt \right] \qquad (XII)$$

where $t_0'$ indicates the point in time of the start of a field of $n$ traces, $t_n''$ the point in time of completion of the field, and the integration periods $(t_i' - t_{i-1}'')$ are those periods during which the scan of light spot 44 is not producing a trace portion within region 62.

It is the right hand member of Equation XII which is evaluated by the planar computer of this invention.

In the embodiment illustrated in FIGURE 1, the integrand signal generator 50 generates a voltage signal at output terminal 66 which is equivalent to $y^p$, $y$ being the vertical position coordinate of light spot 44 at any time, and $p$ an integer or zero. This integral signal $y^p$ at terminal 66 is the input to gate 52. The output from gate 52 at terminal 68 is either the $y^p$ signal or a steady zero, ground potential, signal depending upon which of two alternate values, "gate open" or "gate closed" respectively, of a gating signal is received at terminal 70. The gating signal generator output to terminal 70 depends upon whether or not photocell 48 is illuminated by light from phosphorescent light spot 44. For example, the gating signal generator circuit may be arranged to produce a "gate open" signal when light spot 44 is visible within the relatively transparent area 62 of mask 58 and a "gate closed" signal at other times. As a consequence, the voltage signal appearing at terminal 68 will be equivalent to the desired power of the $y$ position coordinate of the light spot during the periods $(t_i'' - t_i')$ for each of the $m$ traces across area 62 and equivalent to zero for the other time periods in Equation XII. The gate output, $y^p$ or zero, at terminal 68 is the input to integral signal generator 54.

Integral signal generator 54 comprises a direct coupled operational amplifier 72 arranged as an integrator with a resistive input via resistance $R_1$ and capacitive feed-back via capacitance $C_1$. Operational amplifiers and their application as computer elements are well known in the art (see Electronic Analog Computers, Korn and Korn, McGraw-Hill Book Co., New York, 1952), the relationship between an input voltage $e_i$ at terminal 68 and the output voltage $e_0$ at terminal 74 being:

$$e_0 = -1/R_1 C_1 \int_{t''}^{t'} e_i dt \qquad (XIII)$$

where $(t' - t'')$ is the time period of an integration. The constant factor $1/R_1 C_1$ may be incorporated in a scaler constant and since it may be corrected in any read-out display, the sign of $e_i$ may be disregarded. The input $e_i$ at terminal 68 is alternately $y^p$ during a "gate open" portion of a trace and 0 during a "gate closed" portion of a trace. The limits of alternate integration periods are the intercept times, $t_1'$, $t_1''$, etc. at which the gating signal changes. Therefore, the output at terminal 74 at time $t_n''$ is an integral signal voltage equivalent to evaluation of the left hand member of Equation XII, and hence to an evaluation of the encoded problem. The integral signal generated by integral signal generator 54 may be taken from a read-out means, such as high impedance voltmeter 76, connected directly between terminal 74 and ground when evaluations employ a single field. With conventional flying spot scanner means 20 an entire field of traces (and retraces) is completed within 1/60 second.

It will be apparent that the elimination of retrace blanking will produce no anomalies in the evaluation of the integral equations. Inclusion of the retraces yields an additional set of $n$ traces per field, doubling the number of terms in Equation XII without any change of form. Scaler magnitude is also doubled, however, by the inclusion of retrace terms. This may be corrected for in the scale of the read-out means or by proper choice of other scaler factors included in the constant $c''$.

Details of a preferred circuit will now be described. The integrand signal generator 50 comprises alternative means 78, 80 and 82, for generation of integrand signals $c'y^p$ for $p=0$, $p=1$ and $p=2$ respectively. Each is connected to a terminal 84, 86, or 88 of switch 90, which in turn is connected to terminal 66. The integrand signal for $p=0$ is a constant voltage selected by means of variable tap 92 on a potentiometer resistor 78 connected between ground and a positive potential. By proper positioning of tap 92, the signal at switch terminal 84 may be selected to include any desired scaler factor and to be equivalent to the constant $c'$.

Generation of the integrand signal for $p=1$ employs a direct coupled operational amplifier 80 with a variable feed-back resistor $R_2$ and a fixed input resistor $R_3$, the latter being connected at terminal 96 to the output of vertical sweep generator 38. This conventional scaling circuit will provide an output at terminal 86 equal to $-V_v R_2/R_3$, where $V_v$ is the negative voltage which prescribes the vertical position of the light spot 44. The ratio of $R_2$ to $R_3$ may be chosen to provide desired scaling so that the output at terminal 86 will be a positive voltage waveform constituting the integrand signal $c'y$.

The integrand signal for $p=2$ is generated by means of operational amplifier 82 having a feed-back capacitor $C_2$ for integration and an input resistor $R_4$ connected at terminal 98 to the negative $V_v$ output of vertical sweep generator 38. Since $V_v$ is equivalent to $y$ and has a constant slope, its integral with respect to time will be equivalent to $y^2/2$. Corresponding to Equation XIII, the output at terminal 88 will be:

$$-1/R_4 C_2 \int V_v dt = c'y^2 \qquad (XIV)$$

when the product $R_4 C_2$ is adjusted to produce the desired scaler factor $c'$.

Thyratron 100, provided for discharging capacitor $C_2$ at the end of each scanning field, has an anode 102 connected to the output side of $C_2$, a cathode 104 connected to the input side of $C_2$ and a control grid 106 capacitively coupled, via capacitor 108, to the output of vertical sweep generator 38 to receive the $V_v$ waveform as a grid control signal. Negative bias for grid 108 with respect to cathode 106 is provided by a bias potential source 110. At the end of the last trace of the scanning field, the positive slope of the $V_v$ waveform will induce a positive pulse across capacitor 108 to overcome the negative grid bias. Thereupon, thyratron 100 will conduct and discharge capacitor $C_2$. Since stored potential on capacitor $C_2$ provides the anode-cathode potential for thyratron 100, the tube current will be extinguished, and the tube will be returned to grid control, upon completion of the capacitor discharge.

Other alternative subcircuits may be added to integrand signal generator 50 as desired. Switch 90 provides for selection among the alternative subcircuits to provide an integrand signal voltage at terminal 66 equivalent to the desired function of $c'y^p$.

The gating signal generator 46 comprises a photocell means 48 having an anode 112 connected to a source of positive potential and a photoemissive cathode 114 connected to a ground or negative potential. Switch 116 allows selection of the potential impressed upon terminal 118 from either that of terminal 120 in the photocell anode circuit or that of terminal 122 in the cathode circuit. During a period when cathode 114 is illuminated, that is, when the light spot 44 flashes through an area of mask 58, a current flows through the photocell 48, the potential at anode terminal 120 is depressed and at cathode terminal 122 the potential is elevated relative to the respective potentials at these terminals during occulting of light spot 44. Either of these double-valued signals may be selected for gating signal generation. However, assuming that switch 116 is in the position shown, the gating signal output at terminal 70, inverted by amplifier 124 and sharpened by networks 126 and 128 will have a more positive value during flashing periods and a significantly less positive value during occulting periods. Switch means 116 may be coupled directly to terminal 70 in some applications; however, the points in time corresponding to the intercepts of light spot 44 with the closed curve 64 during successive traces would not be as well defined as with the preferred circuit. Due to the rapidity of the scanning sequence, coupling between switch 116 and terminal 70 may be what is known as A.C. coupling but it will function here as direct coupling when capacitors 130 and 132 are selected to pass the signal from switch 116 with only slight exponential decay between alternations. The RL network 134 may be provided in the anode circuit of amplifier 124 to further sharpen the gating signal.

The output of amplifier 124 is capacitively coupled via capacitor 136 with terminal 70 and superimposed upon a D.C. biasing potential provided by the arrangement of resistors 138, 140. Therefore, the selected anode or cathode circuit potential excursions of photocell 48 are sharpened, amplified and inverted to provide the gating signal with alternate relatively negative "gate closed" and relatively positive "gate open" values. By means of switch 116, these gating signal values correspond directly or reciprocally with the flashing and occulting of light spot 44 as it is scanned across the differential light transmitting areas 60 and 62 of mask 58.

Gate circuit 52 comprises cathode follower 142, sharp cut-off triode 144 and the logical coincidence circuit of diodes 146, 148, 150. The common anode terminal 152 of diodes 146 and 148 is connected to output terminal 68 and, via resistor 154, to a positive potential source. The control grid 156 of triode 144 is coupled with terminal 70 to receive the gating signal from gating signal generator 46. The output at cathode terminal 158 will be highly positive when triode 144 is conducting during "gate open" periods and highly negative during quiescent periods corresponding to the receipt of the "gate closed" portions of the gating signal at terminal 70. The control grid 160 of cathode follower 142 is coupled with terminal 66 to receive the positive integrand signal from integrand signal generator 50. The output at cathode terminal 162 will, with some scaling, be the integrand signal having, for example, an intermediate positive range less than the potential at terminal 152 when triode 144 is conducting, and greater than the potential at terminal 152 when triode 144 is cut off. Therefore, diode 146 conducts and diode 148 is blocked during "gate open" periods so that the integrand signal appears at terminal 152. During "gate closed" periods, diode 146 is biased against conduction, diode 148 conducts, and the negative going potential at terminal 158 is impressed upon terminal 152. The positive integrand signal at terminal 152 blocks diode 150 and appears at output terminal 68 during "gate open" periods. During the alternate "gate closed" periods, however, the negative going potential from terminal 158 biases diode 150 to conduct and clamps the output potential at terminal 68 at the zero or ground potential of the diode 150 anode connection. Consequently, the voltage waveform at terminal 68, and the input to integral signal generator 54, is an integrand signal equivalent to $c'y^p$ for the periods $(t_1''-t_1')$ during which the "gate open" gating signal value indicates that light spot 44 is forming a trace portion within a region 62 under investigation. During the time periods for the remaining trace portions, a zero integrand is prescribed as the integral signal generator input.

The integration by the circuit of operational amplifier 72 of the integral signal generator 54 has been described hereinabove. Discharge of the feed back capacitor $C_1$ at the end of each scanning field is accomplished by operation of thyratron 162 in the same manner as the discharge of capacitor $C_2$ by thyratron 100. However, the electrode connections for thyratron 162 are the reverse of those for thyratron 100 because the integrand signal input to operational amplifier 72 is a positive (i.e. non-negative) waveform.

The illustrated output circuit for integral signal generator 54 includes a storage or averaging capacitor $C_3$ connected to ground and, via diode 164 to terminal 74. Diode 164 prevents discharge of $C_3$ through thyratron 162. Discharge resistor $R_5$, connected in parallel with $C_3$, provides for controlled discharge of $C_3$ between repeated evaluations. Read-out of the integral signal is by means of high impedance voltmeter 76 connected, serially with variable resistor 166 to provide scaling, in parallel with capacitor $C_3$.

The description has been restricted to evaluations employing but a single scanning field and with read-out at the end of the field. It is preferred, however, to repeat the field evaluations sequentially and to present the average value of a sequence of evaluations. This is provided for by the operation of the $R_5C_3$ network as a filter or averaging network. Television receiver type flying spot scanner means 20, has a field repetition rate sufficiently high so that a sequence of integral signal evaluations may be considered as an A.C. signal, the average amplitude of which is the desired evaluation. The time constant $R_5C_3$ is adjusted so that there is only the slight discharge of $C_3$ between peak values of the integral signal sequence to allow for adjustments of the D.C. value of the filter output. The small ripple remaining in the filter output will be smoothed out due to the inertial time constant of the voltmeter 76. After the first few fields of the sequence of evaluations, $C_3$ will be charged and the indication on voltmeter 76 will be steady and will indicate directly a voltage equivalent to evaluation of Equation XII.

While the continuous read-out system for integral signal generator 54 is advantageous generally, since spurious errors are reduced, it is especially advantageous where it is desired to investigate dependence of the evaluation of Equation XII upon rotational orientation of a representative area. For example, principal axes of inertia of an area 62 for a given point in the area may be readily determined by rotation of the area 62 about that point until the angular positions are found which produce minimum and maximum indications on voltmeter 76.

The effective translations of a figure perpendicular to the $x$ axis may be similarly determined by correlation of the read-out information with vertical displacements of the figure. Further, by the use of a multi-part mask, the shape of the figure investigated may be adjusted continuously during the continuous sequence of evaluations to determine configurations which produce a desired specific result for evaluation of Equation XII. Of course, investigation of the effect of parametric variations upon the quantity evaluated need not be by continuous adjustment of the mask representation. Discrete changes by substitution of different masks or mask positions may be investigated in turn until the desired information has been obtained. For example, the dependence of the moment of inertia of the I-beam cross-sectional representation 64 upon an increase in web thickness may readily be seen when successive evaluations are made upon cutting away of opaque portions of the mask 58 in small increments to represent small changes in the web thickness.

In many instances it will be convenient to represent the figure being investigated as an occulting area or silhouette rather than as a transmitting or cut-out area. A silhouette mask would be the complement of mask 58. The complementary integral generator input signal is obtained by the simple expedient of cycling switch 116 in the gating signal generator 46 to utilize the photocell cathode signal from terminal 122. The integrand signal generator output will then appear at terminal 68 when light spot 44 is occulted, and the output at terminal 68 will be zero during flashing periods.

It is not necessary that the representation of the figure under investigation be a void in a mask or an opaque silhouette area. It is only necessary that the differential transmission areas exhibit sufficient light transmission variation to produce significant alteration in the anode-cathode current of photocell 48. A relatively simple method of accomplishing the representation is to photograph the area to be investigated and to use either a negative or a positive film for the mask 58. Similarly the representation may be made by marking directly upon the glass surface of cathode ray tube 22 which overlays the phosphorescent coating 22 or a physical object may itself be substituted for the mask 58.

The above discussion has been limited to the evaluation of expressions which are single valued with respect to translations parallel with the $x$ axis. However, it will be apparent that in this orthogonal system a substitution of coordinates may be made either by rotating the investigated figure through 90° or by an interchange in the application of the sweep voltages. Connection of deflection plate 34 to terminal 142, and connection of deflection plate 40 to terminal 144 will rotate the scanning field 90°. By either of these expedients the $\bar{x}$ horizontal position of the centroid of area, the moment of inertia $I_y$ about the $y$ axis and other horizontal position dependent functions may be computed in the same manner as the illustrated evaluations of functions with respect to the vertical position coordinate.

As in any evaluation by means of a summation, precision may be increased by increasing the number of the incremental strips or traces contributing terms to the summation. It will be apparent that the scanning frequency of the $V_h$ waveform can be increased so that many more traces are made across the investigated region. Such traces may overlap, in which case the scaler $c''$ may be adjusted accordingly or the vertical dimension $\Delta y$ of the light spot 44 may be diminished by the use of a narrower electron beam 28.

The limits of precision for the planar computer of this invention are dictated primarily by scanning linearity and by the dimensions of light spot 44. Scanning linearity may be improved by proper selection of the deflection system components, for example, by the substitution of electromagnetic deflection for the electrostatic deflection illustrated. Instead of the voltage waveform $V_h$ and $V_v$, electromagnetic deflection systems produce similarly shaped current waveforms. However, the vertical deflection current waveform may be readily transformed into the voltage signal $V_v$ for use in the system illustrated whenever the extra expenditures are justified by the need for maximum scanning linearity over a large region. The dimensions of light spot 44 depend upon columnation of the electron beam, a function of electron gun 26, and upon the resolution of the phosphorescent surface 24. With commercially available flying spot scanner means, the most significant source of error is the smearing of the light spot 44 laterally due to the spreading of the phosphorescence and, in the trace direction, due to the finite time required for decay of the phosphorescence.

It has been tacitly assumed that illumination of photocell 48 from sources other than the incidence of electron beam 28 upon phosphorescent screen 24 is insufficient to affect production of the gating signal. Even in a well lighted room, this condition may be obtained by means of a lens system 56 or by means of an enclosure for the optical portions of the system.

Although the invention has been described in terms of specified apparatus which is set forth in the drawings, it should be understood that this is by way of illustration only, and that the invention is not necessarily limited thereto since alternative embodiments and operating techniques will be apparent to those skilled in the art in view of the disclosure. Accordingly, modifications are contemplated which may be made without departing from the spirit of the described invention or the scope of the appended claims.

What is claimed is:

1. A planar computer system for evaluating integral functions F of a plane region R within a region R', of the type $F = c \int_R y^p dA$ where $y$ is a position coordinate of the differential area $dA$, $p = 0, 1, 2$ alternatively, and $c$ is a scaler constant, which system comprises a scanner including an electron discharge device generating a collimated electron beam, a screen having a phosphorescent surface equivalent to the region R' generating a spot of light where impinged by said beam, a vertical sweep generator generating a triangularly shaped vertical deflection signal voltage waveform of constantly increasing amplitude $V_v$ equivalent to $y$ during an evaluation period, a horizontal sweep generator generating a triangular horizontal deflection signal voltage waveform $V_h$ having a plurality of inflections during said period, and means scanning said beam over said surface in a multiplicity of parallel vertically displaced traces and retraces in response to said deflection signal voltages; a mask overlaying said surface having a light occulting area defining the region R, an integrand signal generator generating an integrand signal voltage including first means responsive to said vertical deflection signal voltage waveform generating a first signal proportional to the time integral $\int y dt$ of said vertical position coordinate and having a first integrator capacitor and a first arc discharge device connected in parallel, said device having a first control electrode coupled with said vertical sweep generator and discharging said first capacitor upon inflection of said vertical sweep signal voltage, second means responsive to said vertical deflection signal voltage waveform generating a second signal proportional to said vertical position coordinate $y$, third means generating an invariant third signal voltage equivalent to $dy/dt$, the slope of said vertical position coordinate, and integrand switch means transmitting one of said first, second and third signals as said integrand signal; a gating signal generator including photosensitive means oriented to receive light transmitted from said spot unocculted by said mask having an anode output circuit and a cathode output circuit generating a gating signal alternating between first and second values upon a change between transmission and occulting of said light by said mask during said traces and retraces; a gate circuit coupled with said integral generator generating a gated integrand signal alternating between equivalence with said integrand signal voltage and a zero reference voltage in response to alternations of said gating signal; and an integral signal generator generating an integral signal proportional to the time integral of the gated integrand signal including a second integrator capacitor and a second arc discharge device connected in parallel, said second device having a second control electrode coupled with said vertical sweep generator and said second device discharging said second capacitor upon inflection of said vertical sweep signal voltage, a parallel combination of an averaging capacitor and discharge resistor connected between a zero reference potential source and a diode, said diode being connected between said integrator and said parallel combination to conduct integral signals of increasing magnitude, and a series combination of a high impedance read-out means and a high impedance variable scaling resistor connected in parallel with said averaging capacitor, whereby said read-out means indicates an average value equivalent to $c\int_R y^p dA$.

2. A planar computer system for evaluating double-integral functions of a plane region, which system comprises a scanner including an electron discharge device generating a collimated electron beam, a screen having a phosphorescent surface generating a spot of light where impinged upon by said beam, a vertical sweep generator generating a vertical deflection signal voltage of constantly increasing amplitude during an evaluation, a horizontal sweep generator generating a reciprocating horizontal deflection signal voltage during said period, and means scanning said beam and said spot over said surface in a multiplicity of parallel displaced traces in response to said deflection signal voltages; a mask overlaying said screen having a light occulting area defining said region; an integrand signal generator generating an integrand signal voltage proportional to a power of said vertical deflection signal voltage; an integral signal generator responsive to said integrand signal voltage generating an integral signal voltage equivalent to the time integral of said integrand signal voltage when effectively coupled with said integrand generator during said period; a gating signal generator including light sensitive means oriented to receive light from said spot generating a gating signal voltage having alternate values corresponding to transmission and occulting of said light by said mask; and a gate circuit responsive to said gating signal effectively coupling together and decoupling said integrand and integral signal generators upon alternation of said gating signal.

3. The computer system of claim 2 wherein said light occulting area is a silhouette of said region.

4. The computer system of claim 2 wherein said light occulting area is complementary to said region.

5. The planar computer system of claim 2 wherein said integrand signal generator includes an operational amplifier integrator coupled with said vertical sweep generator and energized by said vertical deflection signal voltage generating an integrand signal proportional to the time integral of said vertical deflection signal voltage during said evaluation.

6. The planar computer system of claim 2 wherein said gating signal generator includes a photosensitive electron discharge device having a cathode output circuit and an anode output circuit, an output amplifier, and switch means selectively coupling said output amplifier with one of said output circuits.

7. The planar computer system of claim 2 wherein said integral signal generator includes an operational amplifier integrator having an integrator capacitor and an arc discharge means coupled in parallel with said capacitor having a control electrode coupled with said vertical sweep generator, said arc discharge means discharging said capacitor in response to inflection of said vertical deflection signal voltage.

8. The computer system of claim 5 wherein said integrator includes a feed-back capacitor and arc discharge means coupled in parallel with said capacitor having a control electrode coupled with said vertical sweep generator, said arc discharge means discharging said capacitor in response to inflection of said vertical deflection signal voltage.

9. The planar computer system of claim 7 wherein said integral generator includes a parallel combination of an averaging capacitor and a discharge resistor connected between a zero reference potential source and a diode, said diode being connected between said integrator and said parallel combination to transmit integral signals of increasing amplitude.

10. The planar computer system of claim 9 wherein said integral signal generator includes a series combination of a high impedance read-out means and a high impedance variable scaling resistor connected in parallel with said averaging capacitor.

11. A planar computer for evaluating integral functions of a plane figure represented as a differential light transmission portion of a mask, which computer comprises a screen, means producing a spot of light on said screen, scanner means scanning said spot over said screen in successive displaced traces, light sensitive means oriented to receive differential intensities of light from said spot according to the position of said portion when said mask is superimposed upon said screen generating a gating signal corresponding to said differential intensities, an integrand signal generator generating an integrand signal proportion to a function of a position coordinate of said spot, an integral signal generator generating an integral signal proportion to the time integral of said integrand signal when energized by said integrand signal, and a gate circuit responsive to said gating signal selectively transmitting said integrand signal to said integral signal generator.

12. The planar computer of claim 11 wherein said gating signal generator comprises a light sensitive electron discharge device having a cathode output circuit and an anode output circuit.

13. The planar computer of claim 11 wherein said integrand signal generator comprises first means generating a first voltage signal of constant amplitude, second means generating a second voltage signal of linearly increasing amplitude during said scanning, third means generating a third voltage signal proportional to the time integral of said second signal during said scanning and switch means selectively transmitting one of said first, second, and third signals as said integrand signal.

14. The planar computer of claim 11 wherein said integral signal generator comprises means responsive to successive integral signals generated upon repeated evaluations of said function generating a signal proportional to the averaging value of the successive integral signals.

15. The planar computer of claim 11 wherein said gate circuit comprises a diode circuit selectively transmitting said integrand signal and a zero potential in response to said gating signal.

References Cited in the file of this patent

UNITED STATES PATENTS 2,705,901   Sherwin _____ Apr. 12, 1955